(12) United States Patent  
Stelzl

(10) Patent No.: US 9,221,423 B2  
(45) Date of Patent: Dec. 29, 2015

(54) GRIPPING DEVICE

(71) Applicant: Hans Werner Stelzl, Aufkirchen (DE)

(72) Inventor: Hans Werner Stelzl, Aufkirchen (DE)

(73) Assignee: Hans Werner Stelzl, Aufkirchen (DE)

( * ) Notice: Subject to any disclaimer, the term of this patent is extended or adjusted under 35 U.S.C. 154(b) by 0 days.

(21) Appl. No.: 14/415,218

(22) PCT Filed: Jul. 8, 2013

(86) PCT No.: PCT/EP2013/064418  
§ 371 (c)(1),  
(2) Date: Jan. 16, 2015

(87) PCT Pub. No.: WO2014/012813  
PCT Pub. Date: Jan. 23, 2014

(65) Prior Publication Data  
US 2015/0191146 A1    Jul. 9, 2015

(30) Foreign Application Priority Data

Jul. 16, 2012  (DE) .................... 10 2012 212 443  
Jul. 27, 2012  (DE) .................... 10 2012 213 300

(51) Int. Cl.  
*B60R 22/03* (2006.01)  
*B60R 22/02* (2006.01)

(52) U.S. Cl.  
CPC .............. *B60R 22/03* (2013.01); *B60R 22/023* (2013.01)

(58) Field of Classification Search  
CPC .......... B60R 22/03; B60R 22/023; B25J 1/04; A47F 13/06

USPC ................ 294/26, 211; 297/481, 485, 463.1, 297/463.2, 468  
See application file for complete search history.

(56) References Cited

U.S. PATENT DOCUMENTS

| | | | | |
|---|---|---|---|---|
| 584,133 | A * | 6/1897 | McIntire | 105/354 |
| 4,681,345 | A * | 7/1987 | Swartout | 280/801.1 |
| 4,944,557 | A | 7/1990 | Tsubai | |
| 5,197,176 | A * | 3/1993 | Reese | 29/278 |
| 5,217,240 | A * | 6/1993 | Gardenhour et al. | 280/282 |
| 6,430,797 | B1 * | 8/2002 | Dittmar et al. | 29/278 |
| 7,011,375 | B1 | 3/2006 | Tyler | |
| 7,503,587 | B2 * | 3/2009 | Corcoran | 280/801.1 |
| 2004/0080203 | A1 * | 4/2004 | Meloul | 297/463.1 |
| 2008/0290717 | A1 * | 11/2008 | Klapp | 297/468 |

FOREIGN PATENT DOCUMENTS

| | | |
|---|---|---|
| CH | 700539 A2 | 9/2010 |
| DE | 102008056823.6 A1 | 5/2010 |
| GB | 2120080 A | 11/1983 |

* cited by examiner

*Primary Examiner* — Dean Kramer  
(74) *Attorney, Agent, or Firm* — Altman & Martin; Steven K Martin

(57) ABSTRACT

The invention relates to a gripping device (1) which is used to detect a safety belt, for example a three-point safety belt in a motor vehicle, and which can be fastened separately from the plug-in tongue on the belt strap (2) of the shoulder part of the safety belt. The gripping device comprises a recess end (8) with a recess (10) for receiving the belt strap and a gripping end (9) which is designed to engage.

9 Claims, 4 Drawing Sheets

GRIPPING DEVICE

The invention relates to a handle for grasping a safety belt, e.g. in a motor vehicle, which may be mounted onto the strap of the safety belt independently of the latch plate.

Devices for facilitating the movement of a safety belt in order to belt up in a motor vehicle are known from the state-of-the-art. In conventional passenger cars, and in particular in 2-door models thereof, the B pillar, onto which safety belts are affixed, is located relatively far towards the back in relation to the driver's seat, such that the safety belt may not be grasped easily by reaching across the shoulder. In consequence, especially older people often are negligent in using the safety belt, as reaching it may be difficult. Within the group of seat belt buckle aides available on the market, a distinction is made between automatic seatbelt forwarding systems, which move e.g. the belt from the B-pillar towards the user via an extending arm, and purely manual devices, which must be grasped directly by the user for forwarding and which are situated either immediately on the safety belt or on the latch plate.

The German patent application DE 10 2008 056 823 A1 relates to a seat belt buckle aid which is mountable to the strap of a safety belt and which in total consists of a flat handle body, which is formed fully flat regarding at least the most part. The body may be provided with means suited to facilitate the bending of the body around the strap of the seat belt. Attaching of the seat belt buckle aid to the strap, around which it is wound in one or more layers, is accomplished by means of a plastic button, a plastic screw or by means of adhesive or Velcro-like areas.

In document GB 2 120 080 A, a handle having a length of from 5 cm to 25 cm is described, which protrudes from a safety belt, and which is attached to the safety belt by means of adhesive of by self-adhesive means, the handle being made preferably from textile material, more preferably from the same material as the safety belt.

U.S. Pat. No. 4,944,557 A relates to a seat belt handle assembly for use with the safety belt of a vehicle, which comprises a clip assembly slidably attached to the sash part of the safety belt and a handle fitted with a grasp, which extends from the clip assembly. The clip assembly encloses the safety belt via an upper and a lower member, wherein the upper and the lower member are connected to each other by means of one or more projection(s) and one or more corresponding openings.

Document DE 100 45 798 A1 discloses a safety belt grasping device, which is mounted onto the latch plate bearing buckle as a tuft-like structure made out of metal or plastic and which allows for allocation of the buckle in space. Document DE 296 18 798 A1 also discloses a belt device, which is secured to the latch in a formfitting manner and which consists of a rod-shaped elastic component formed at its one end with a spherical or annular recess.

Handles for safety belts, in particular vehicle safety belts, as known from the prior art are disadvantageous on the one hand in that they require, at least in part, some considerable effort regarding their mounting, such that the simple moving them to another safety belt is time-consuming and requires the use of special tools. Moreover, the removal of devices, which were glued on to a belt, necessitates elaborate cleaning of the residual adhesive. Furthermore, devices which are easy to mount often are characterized by only a limited stability and a handle surface, the dimensioning of which is inadequate for easy grasp or engagement and whose orientation is ergonomically unsound. In some cases, handles for safety belts are further made from a relative inflexible material, such that they protrude inconveniently from the buckle after use and may be a hindrance during driving, e.g. due to threading.

SUMMARY OF THE INVENTION, OBJECT, SOLUTION, ADVANTAGES

Based on the devices of the prior art, the object of the present invention was the provision of a handle, which is devoid of the disadvantages associated with the state of the art as mentioned afore. Further, the handle should be inexpensive to produce, such that high acquisition costs may not impede widespread dissemination in the market. Such widespread dissemination could positively influence the belting up behavior in general.

The problem underlying the invention is solved by the device of the invention according to the claims, as will be apparent also from the following examples.

In a first aspect the invention relates to a handle (1) for a safety belt of a motor vehicle with a belt strap (2) and a latch plate (3), which comprises a basic member with a first height (4), a second height (41), a length (5), a first (6) and a second face (7), and a recess end (8) and a grasp end (9). Therein, the recess end (8) is formed with the first height (4) and the grasp end (9) is formed with the second height (41). The handle (1) of the invention is attachable to the belt strap (2) independent of the latch plate (3). Generally, the handle (1) for a regular motor vehicle three point safety belt may be arranged—in relation to the latch plate (3) attached to the sash part of the belt strap (2)—in an upward direction along the belt (i.e. towards the B pillar) or in a downward direction along the belt (i.e. towards the end fitting and or the tensioning device). Preferably, the handle (1) is arranged on the belt strap (2) in relation to the latch plate (3) in an upward direction along the belt. Alternatively, the handle (1) may be placed in relation to the latch plate (3) downwardly along the belt; in this case it is preferred to place the handle towards the top of the belt in relation to a belt stopper affixed to the belt. The recess end (8) of the handle (1) is formed with a recess (10) for accommodating the belt strap (2). The recess (10) is delimited by a first (101), a second (102), a third (103) and a fourth recess side surface (104), wherein the first recess side surface (101) is formed with the first (11) and a second limb (12). The recess (10) thus delimited is formed, with respect to its geometrical dimensioning, at large, as a rectangular cuboid, where edges (a), (b), and (c) correspond to the length, height, and depth of the rectangular cuboid. The length (edge (a)) of the cuboid is correlated at large with the width (17) of the belt strap (2), which is in the range of 46 mm to 48 mm for commercially available belt straps in motor vehicles. The height (edge (b)) of the cuboid equals the first height (4) of the basic member, and the depth (edge (c)) of the cuboid is equal to the thickness of the belt strap (2), which in commercially available belt straps in motor vehicles is in the range of 1.05 mm to 1.3 mm. The first (101) and the third recess side surface (103) thereby are defined by edges (a) and (b) of the cuboid, and accordingly, the second (102) and the fourth recess side surface (104) are defined by edges (b) and (c) and of the cuboid.

The grasp end (9) of the handle (1) is provided with at least one engagement means (13), which preferably may be shaped as a loop (14). In relation to the belt strap (2) the engagement means (13) is arranged such that during use the plane of its opening, e.g. the loop, lies in a plane substantially horizontal and perpendicular to the plane of the largest surface extension of the belt strap (2); or, respectively, in a plane substantially parallel to the plane of the depth (c) of the recess (10), which is configured as a rectangular cuboid.

The handle (1) thus configured may easily be attached to and removed from a conventional safety belt, e.g. the sash part of a three point safety belt for a motor vehicle. Fastening and removing the handle (1) does not require special tools and fasteners; moreover, removal of the handle (1) is residual free. Further, a user may easily reach for and grasp the handle (1), since the opening of the engagement means (13) is oriented advantageously.

In a preferred embodiment of the handle (1) of the invention, the recess side surface (101, 102, 103, 104) may be formed with at least one of a thickness d. The thickness d of a recess site surface (101, 102, 103, 104) therein relates to the distance between the side face of the recess side surface (101, 102, 103, 104) facing the recess (10) and its respective side face facing the opposite direction. In those cases in which the recess side surfaces (101, 102, 103, 104) are formed with a thickness d, the thickness d of the first recess side surface (101) is equal to the thickness d of the second recess side surface (102), the thickness d of the third recess side surface (103) and the thickness of the fourth recess side surface (104). Preferably, the recess side surfaces (101, 102, 103, 104) are beveled at the end towards the first (6) and the second face (7) of the basic member. The handle (1) thus configured exhibits all advantages mentioned afore, and is characterized, furthermore, by a simple manufacturing process, since no complicated calculations are necessary for manufacturing the recess side surfaces (101, 102, 103, 104) of the recess (10), as only plane surfaces have to be produced or connected to each other, respectively. Due to the plane surfaces with respective terminal bevels, the belt strap (2) arranged within the recess (10) may be conducted smoothly and is prohibited from being damaged by tilting.

In a further embodiment of the handle (1) of the invention, at least two of the recess side surfaces (101, 102, 103, 104) may be constructed with a thickness d, wherein the thickness d may vary along the first height (4) such that those side faces of the at least two recess side surfaces (101, 102, 103, 104) facing the recess (10) exhibit a convex shape. For example, the respective thickness d of the first (101) and the third recess side surface (103), on the side faces facing the recess (10), may be largest at substantially at half of the first height (4) of the basic member, and may be smallest, on the side faces facing the recess (10), in the terminal portions adjacent to the first (6) and the second face (7) of the basic member. Thereby, those side faces of the recess side surfaces (101, 103) facing the recess (10) are protruding towards the recess in a convex direction, such that each recess side surface (101, 103), when viewed in a longitudinal section, exhibits a plano-convex shape. Alternatively or additionally, the respective thickness d of the second (102) and the fourth recess side surface (102), may be largest at substantially at half of the first height (4), and may be smallest, on the side faces facing the recess (10), in the terminal portions adjacent to the first (6) and the second face (7) of the basic member. Thereby, those side faces of the recess side surfaces (102, 104) facing the recess (10) are protruding towards the recess in a convex direction, such that each recess side surface (102, 104), when viewed in a longitudinal section, exhibits a plano-convex shape. Depending on the construction of the respective recess side surfaces (101, 102, 103, 104), the recess (10) thus delimited is largely a rectangular cuboid with at least two concavely shaped side surfaces. It is particularly preferred if the recess (10) is delimited by four recess side surfaces (101, 102, 103, 104) which are constructed on their side faces facing the recess (10) with a convex curvature, whereby, correspondingly, the recess (10) exhibits, at large, the form of a rectangular cuboid having four concavely shaped side faces.

The handle (1) thus formed allows for an excellent guidance of the belt strap (2), since the belt strap (2) arranged in the recess (10) exhibits optimal slip due to only limited contact with the recess side surfaces (101, 102, 103, 104) delimiting the recess (10). Furthermore, such a handle (1) is prohibited effectively from jamming or tilting during shifting movements.

In a preferred implementation, the first height (4) of the basic member may be larger than the second height (41). It is preferred that the first height (4) and the second height (41) are proportioned relative to each other in a range of 3-10:1; particularly preferred is a size ratio in a range of 3-8:1, and most preferred in a range of 4-6:1. The recess end (8) of the basic member, which comprises the recess (10), thus configured may, on the one hand, be placed on the belt strap (2) easily and substantially as stable as to allow for easy sliding on the belt strap (2)—but without coming free of the belt strap (2) unless manipulated by the user. On the other hand, in relation thereto, the grasp end (9), comprising the engagement means (13), is dimensioned with regard to its height (which corresponds to the second height (41)) such that it may be stowed easily after buckling, e.g. in the gap between the car seat and the center console.

In a further implementation of the handle (1) according to the invention, the first (11) and the second limb (12) of the recess side surface (101) may delimit a recess opening (15) for inserting the belt strap (2), wherein said recess opening (15) is formed substantially along the first height (4) of the handle (1) and wherein said recess opening (15) opens towards the first (6) and second face (7) of the handle (1). The belt strap (2), which is configured with a first (20) and a second (21) edge of the belt strap, may be arranged in the recess (10) via the recess opening (15) such that the first edge of the belt strap (20) is positioned on that side of the recess which is facing away from the grasp end (9) of the basic member; accordingly, the second edge of the belt strap (21) is positioned on the side of the recess which is facing towards the grasp end (9) of the basic member.

Preferably, the recess opening (15) is configured with an opening width (16) corresponding to the 0.25 to 0.1 fold of the width (17) of the belt strap (2). A recess opening (15) such dimensioned allows for easy attachment and removal of the handle (1) according to the invention to and from the belt strap (2) of a conventional safety belt, e.g. of the sash portion of a three-point safety belt for a motor vehicle.

In another implementation of the handle according to the invention (1), the ending of the first (11) and/or the second limb (12) of the recess (10) facing the recess opening (15) may be curved in a direction pointing away from the recess (10). Due to the curved arrangement of at least one limb (11, 12), attaching and removing of the belt strap (2) is facilitated, without adversely affecting the stable positioning of the handle (1) on the belt strap (2).

In a further embodiment, the recess (10) of the handle (1) according to the invention may be configured with a first (18) and a second recess-enlargement (19). The first recess enlargement (18) is arranged on the side of the recess (10) facing away from the grasp end (9) of the basic member and the second recess enlargement (19) is arranged on the side facing towards the grasp end (9) of the basic member. The first (18) and the second recess-enlargement (19) are thus delimited at large by the second recess side surface (102) and the fourth recess side surface (104), respectively. Principally, the first (18) and the second recess enlargement (19) are not limited with respect to their respective geometrical configuration. Preferably, the first (18) and the second recess enlargement (19) are configured such that the belt strap (2) with its first (20) and second edge of the belt strap (21), each facing the respective first and the second recess enlargement (18, 19), lies in a substantially cylindrical cavity, forming the respective recess enlargement. In order to use the handle (1), the belt strap (2) may be threaded into the recess (10) much easier due to the recess enlargements (18, 19), since the respective leading edge of the belt strap (20, 21)—depending on the threading direction—folds slightly within the respective recess enlargement (18, 19) during threading, thereby providing for an enlarged spatial capacity within the recess (10) regarding the subsequent belt strap portions.

In a preferred embodiment of the handle (1) according to the invention, the at least one engagement means (13) may be characterized by a longitudinal extension which is within a range corresponding to the 0.4 to 0.9 fold of the length (5) of the handle (1), especially preferred within the range corresponding to the 0.4 to 0.7 fold of the length (5) of the handle (1). Engagement means (13) thus configured may be engaged comfortably by the user, such that pulling of the belt strap (2) is facilitated advantageously.

In a preferred embodiment of the handle (1) according to the invention, the handle (1) may comprise additionally at least one pin (22) extending into the recess (10). During use, the at least one pin may be used as a guideway for the belt strap (2) arranged within the recess (10), thereby stabilizing overall the respective configuration of the belt strap (2) and handle (1).

In the preferred implementation of the handle (1) according to the invention, the basic member may be formed integrally in a single piece. Such a basic member may be produced easily and does not require complicated assembly of individual components. Thus, production of the handle (1) of the invention may be conducted extremely economically.

In a further embodiment, the handle (1) may be composed of at least two individual parts, preferably of at least three individual parts. The body of a multi-part handle (1) may consist of two parts, e.g. a single piece comprising the recess end (8) and a single piece comprising the grasp end (9). When producing the handle (1), these separate single pieces, each comprising the respective ending, may be put together forming a basic member, e.g. via an inserted, latched, screwed, glued or similar connection. Alternatively, both pieces of the base member may be prepared merely for receiving fastening means, which may be e.g. attached to a further third piece, for example in the form of pins. In a multi-part handle (1), the individual pieces may each be made of a different material, and the respective materials may be selected as to enable advantageously maximal variability with regard to properties required by the user.

In a further implementation of the handle (1) according to the invention, the basic member may be made of a material which is selected from the group consisting of organic polymer, biopolymer, metal, textile fabric, leather, wood, convoluted tubing or a combination thereof. The large variety of materials allows for maximum flexibility in terms of the properties required by the user.

In a preferred embodiment, the base member may consist of at least one organic polymer and/or copolymer, preferably of polyamide and/or a polyamide copolymer, particularly preferably of polyamide 6 and/or a polyamide 6 copolymer. A handle (1) consisting of polyamide may be prepared in a simple and cost-effective manner, for example by processing techniques sufficiently known from the prior art, such as casting, injection molding, thermoforming, extrusion or the like.

In a further implementation of the handle (1) according to the invention (1), the organic polymer may be characterized by hardness of Shore D 70. The Shore hardness is specified in DIN 53505, ISO 868, ISO 7619 (or DIN ISO 7619), and refers to a material parameter of elastomeric polymers. For a determination of hardness at level Shore D, one determines the penetration depth of a spring-loaded steel pin of defined dimensions into the material to be tested and measures on a scale of 0 Shore (2.5 mm penetration) to 100 Shore (0 mm depth). The handle (1) thus designed is characterized by an excellent stability, such that, in particular, the recess end (8), encompassing the recess (10), may be attached to the belt stably and may exhibit sufficient resilience with respect to the strain exerted by the user during use.

In another embodiment of the handle (1) according to the invention (1), the organic polymer is characterized by a roughness Rz in the range of 0.1-10 m. "Roughness" thereby describes the unevenness of the surface height of an object; the Rz value is the average of single surface roughness values of five consecutive sampling paths. In a basic member made of polymer material, it is particularly preferred if the recess end (8) encompassing the recess (10) in the section facing the belt strap (2) exhibits a roughness Rz of 0.1 to 10 m. Due to a low roughness, a basic member thus configured may be moved easily along the belt strap (2) without causing specific abrasion due to friction.

On the other hand, a recess (10) characterized by a roughness Rz of a 0.1-10 m may protect the handle (1) from simply sliding (sliding down) on the strap (2). Here, the roughness is chosen advantageously such that the surfaces delimiting the recess (10) of the recess end (8) do not exhibit any sharp edges causing wear or tear by abrasion to the belt strap (2), as specified in ECE R16, 6.2.1.1.

In a further embodiment, the base member may consist of a combination of at least two polymers, wherein it is particularly preferred to combine a hard and a soft functional element to a so-called hard/soft composite. Accordingly, the base member may be formed as a hard/soft composite molding, wherein a rigid functional element encompassing the recess end (8) may be composed of a thermoplastic resin, e.g. of a technical and/or glass fiber enforced thermoplastic (e.g. polyamide, thermoplastic polyurethane, polypropylene, polybutylene terephthalate, polyoxymethylene). An elastic functional element encompassing the grasp end (9) may consist of a thermoplastic elastomer, which exhibits similar processing characteristics such as thermoplastics, or of a pure elastomer. Thus, due to the combination of different materials in a composite, the basic member may be tailored perfectly to meet the requirements of user. For example, a grasp end (9) comprising the engagement means (13), which is more elastic in comparison to the recess end (8), may easily be stowed after buckling, due to its flexibility, in the gap between the car seat and the center console, while a recess end (8) comprising the recess (10), which is more rigid in comparison to the grasp end (9), may be attached substantially fixed and immovable on the belt strap (2). In the case that the basic member of the handle (1) according to the invention consists of a combination of at least two polymers merged to a hard/soft composite, the polymer forming the rigid recess end (8) comprising the recess (10) may be characterized by a hardness of 70 Shore D). In the case that the basic member of the handle (1) according to the invention consists of a combination of at least two polymers merged to a hard/soft composite, the polymer forming the rigid recess end (8) comprising the recess (10) may be characterized by a roughness Rz of 0.1-10 m with respect to the surface facing the belt strap (2).

In a further implementation of the handle (1) according to the invention, the at least one engagement means (13) may comprise a layer of fluorescent color or a self-luminous layer.

Preferably, the layer of fluorescent color may consist of a fluorescent paint, such as a neon color. The handle (1) thus designed may be perceived easily by the user even in low light and may assist in reminding the user to belt up before driving.

BRIEF DESCRIPTION OF THE FIGURES

These and other objects of the invention, as well as many of the intended advantages thereof will become more readily apparent when reference is made to the following description taken in conjunction with the accompanying drawings.

The specific implementations thereby serve as examples and are not limiting the invention.

FIGS. 1 B and 1 C each show a longitudinal section of the handle (1) according to the invention along its height (4).

PREFERRED EMBODIMENTS OF THE INVENTION

Figure 1:
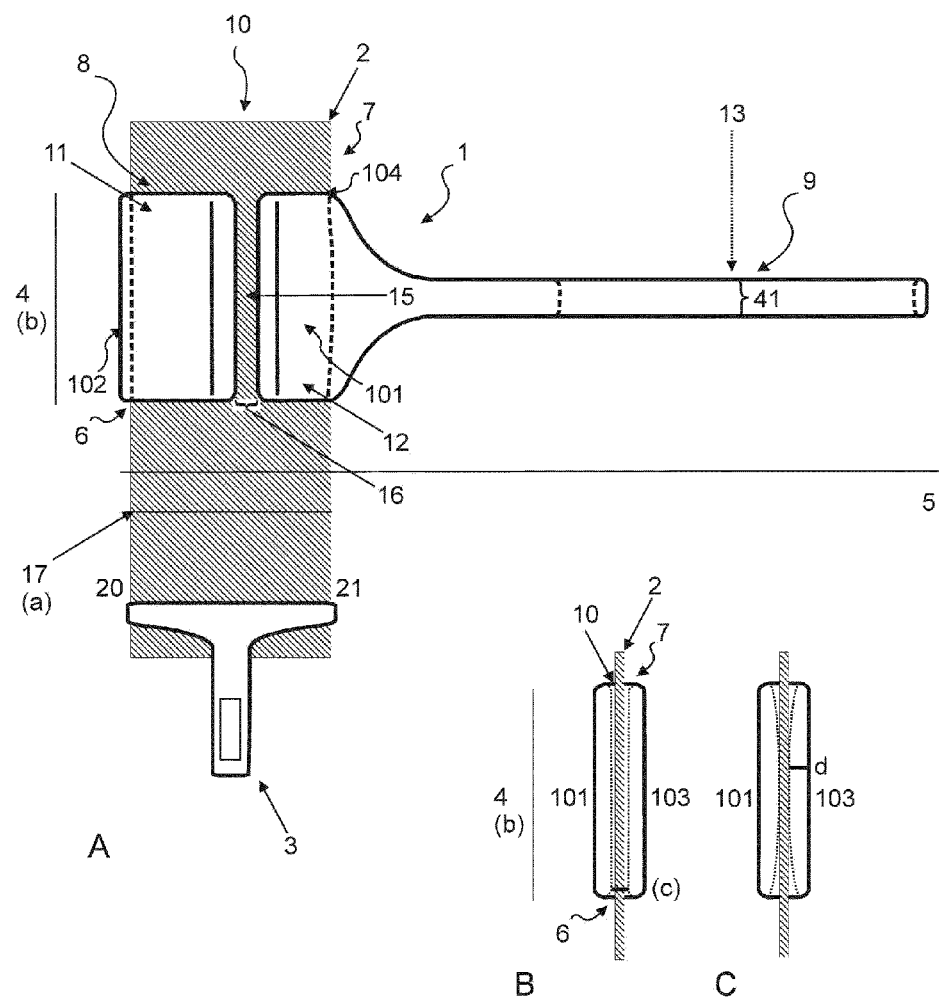
FIG. 1 A depicts a side view of the handle (1) according to the invention, formed integrally, which is placed on the belt strap (2) during use.

FIG. 1 A depicts a side view of the handle (1) according to the invention, in an integral embodiment, during usage. The handle (1) consists of the basic member, which is formed with the first height (4, solid line), the second height (41, curly bracket), the length (5, solid line), the first face (6) and the second face (7), the recess end (8) and the grasp end (9). Therein, the recess end (8) is configured with the first height (4, solid line) and the grasp end (9) with the second height (41, curly bracket). The recess end (8) of the handle (1) comprises the recess (10), which is delimited by a first (101), a second (102), a third (103, not visible) and a fourth recess side surface (104). The first recess side surface (101) is formed with a first (11) and a second limb (12). The recess (10) thus delimited, therefore, is formed largely as a rectangular cuboid with edges (a), (b) and (c). The length (edge (a)) of this cuboid corresponds as large to the width (17) of the belt strap (2), the height (edge (b)) of the cuboid corresponds to the first height (4) of the basic member and the depth (edge (c)) corresponds at large to the thickness of the belt strap (2). The first (101) and the third recess side surfaces (103) are thus defined by edges (a) and (b) of the cuboid, respectively, the second (102) and the fourth recess side surfaces (104) are defined by edges (b) and (b) of the cuboid.

Preferably, the belt strap (2) exhibits the defined width (17) of a conventional safety belt. The belt strap (2), which is configured with the first (20) and the second (21) edge of the belt strap, is arranged in the recess (10) such that the first edge of the belt strap (20) is positioned on that side of the recess which is facing away from the grasp end (9) of the basic member, while the second edge of the belt strap (21) is positioned on the side of the recess oriented towards the grasp end (9) of the basic member. The recess (10) is delimited on one side surface by the first limb (11) and the second limb (12), which abut terminally on the recess opening (15), which is configured substantially along the first height (4), and in the present case is running perpendicular to the first (6) and the second face (7) of the handle (1). A belt strap (2) of e.g. a conventional safety belt may be introduced into the handle (1) conveniently via the recess opening (15) with a defined opening width (16, curly bracket), without necessitating special tools or fasteners. The removal of the handle (1) thus leaves no residuals.

The grasp end (9) is formed with at least one engagement means (13), whose opening is not visible in the lateral view. From this perspective, it may only be deduced that the grasp end (9), exhibiting a smaller second height (41) in relation to the first height (4), may be stowed easily during use due to low space requirements, e.g. within the slot between the car seat and the center console.

FIGS. 1B and 1C each show a section through the recess end (8) comprising the recess (10), whereby the line intersects the first (101) and the third recess side surface (103), delimiting the recess (10), along the first height (4). In FIG. 1B, the recess (10) is configured substantially as a rectangular cuboid, correspondingly, the recess side surfaces (101, 103; not visible: 102, 104) are formed with the same thickness d along the first height (4). Those side faces of the recess side surfaces (101, 103) (dashed lines), which face the recess (10) are therefore formed as planar surfaces. At their terminal endings facing the first (6) and the second face (7) of the basic member the recess side surfaces (101, 103; not visible: 102, 104) are beveled.

In FIG. 1 C, two recess side surfaces (101, 103) are formed with a thickness d such that those side faces of the recess side surfaces (101, 103) facing the recess (10) exhibit a convex curvature, wherein the respective thicknesses d—each on the side facing the recess (10)—are largest at half of the first height (4) of the basic member and smallest at the terminal endings adjacent to the first (6) and the second face (7) of the basic member. When viewed in a longitudinal section, the recess side surfaces (101, 103) thus exhibit a plano-convex shape, whereas the recess (10) is of a bi-concave shape.

Figure 2:
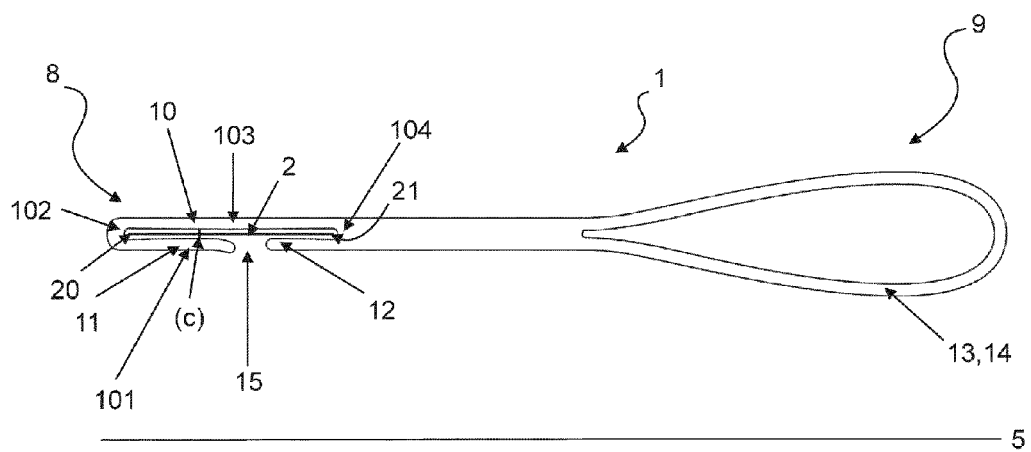
FIG. 2 shows a plan view of the handle (1) according to the invention, formed integrally, with a belt strap (2) arranged in the recess (10).

FIG. 2 shows a plan view of the handle (1) according to the invention, formed integrally, with a belt strap (2) arranged in the recess (10). The grasp end (9) of the handle (1) is formed with the at least one engagement means (13), which preferably is configured as a loop (14). The engagement means (13) is arranged with respect to the threaded belt strap (2) such that the plane of its opening lies in a plane substantially horizontal and perpendicular to the plane of the largest surface extension of the belt strap (2); or, respectively, in a plane substantially parallel to the plane of the depth (c) of the recess (10), which is configured as a rectangular cuboid. Therefore, the plane of the opening is also oriented in a plane substantially horizontal to the plane of the first height (4) of the recess end (8) of the handle (1). Thus, the user is able to easily reach and grasp the handle (1) since during use the opening is facing the grasping hand. The recess end (8) of the handle (1), encompassing the recess (10), provides for a substantially formfitting guideway of the strap (2) in the recess (10), which is delimited by the first (101), the second (102), the third (103) and the fourth recess side surface (104). The end of the first limb (11) of the recess (10) is bent in a direction facing away from the recess (10). Due to the curved arrangement of at least one limb (11, 12), attaching the belt strap (2) of the handle (1) to and removing it from the recess (10) is considerably facilitated without affecting adversely the stable positioning of the handle (1) on the belt strap (2).

Figure 3:
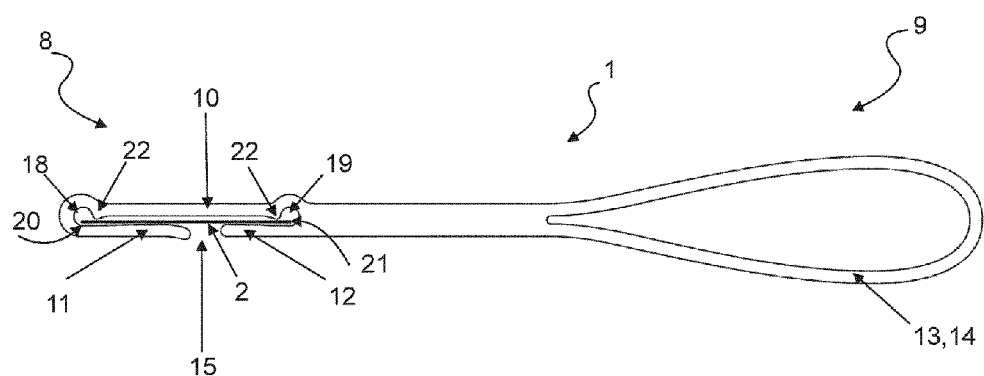
In FIG. 3, a plan view is depicted of a different embodiment of the handle (1) according to invention, formed integrally, with a belt strap (2) arranged in the recess (10).

In FIG. 3, a plan view is depicted of a further embodiment of the handle (1) according to invention with a belt strap (2) arranged in the recess (10).

At least one of the limbs (11, 12) delimiting the recess opening (15) may be bent at its end, such that it is facing away from the recess (10), or, respectively, during use it is facing away from the belt strap running within in the recess (10). The recess (10) is further configured with a first (18) and a second recess-enlargement (19), wherein the first recess enlargement (18) is arranged on the side of the recess (10) facing away from the grasp end (9) of the basic member and the second recess enlargement (19) is arranged on the side facing towards the grasp end (9) of the basic member. The first (18) and the second recess enlargement (19) each are configured as a substantially cylindrical recess enlargement cavity. Thereby, the first (20) and second edge of the belt strap (21) come to rest within each respective recess enlargement cavity. On the one hand, the recess (10) thus configured provides for easy attachment and easy removal of the handle (1) on/from the belt strap (2) due to the at least one curved limb (11, 12) delimiting the recess opening (15), wherein the belt strap (2) may be introduced into the recess opening (15) by a lateral threading motion. On the other hand, the recess enlargements (18, 19), which are configured as largely cylindrical recess enlargement cavities, may facilitate the threading process, since the respective leading edge of the belt strap (20, 21, depending on the direction of threading) may fold along the walls of the recess enlargement cavity into the opposite direction with respect to the threading direction, corresponding to a rolling up of the belt strap (2) during threading. The subsequent sections of the belt strap (2), particularly the belt strap edge (20, 21) consecutive to the respective leading belt strap edge (20, 21), may be threaded into the recess opening (15) even more easily, since some space has been vacated due to the rolling up of the belt strap (2). Furthermore, the recess (10) is configured with two pins (22) protruding in the direction of the first and second limb (11, 12), which serve as a guideway for the belt strap (2) arranged in the recess (10) and stabilize the respective configuration of the belt strap (2) and the handle (1).

Figure 4:
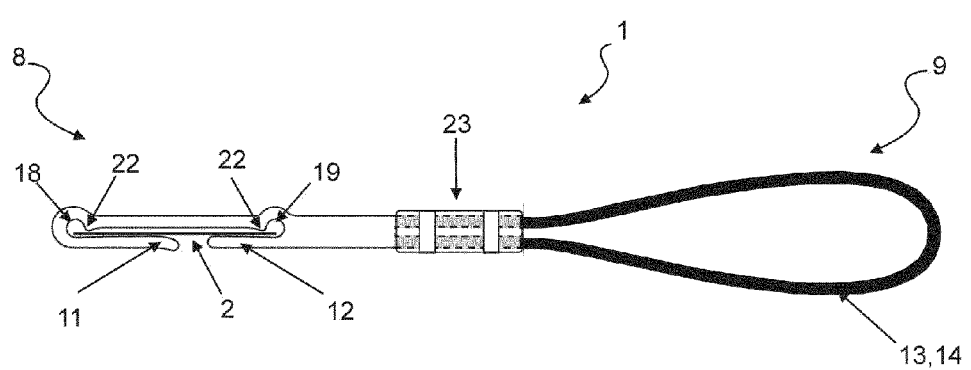
FIG. 4 depicts a plan view of the handle (1) according to the invention, formed as a multipart handle (1), with a belt strap (2) arranged in the recess (10).

FIG. 4 depicts a plan view of the handle (1) according to the invention, formed as a multipart handle (1), with a belt strap (2) arranged in the recess (10). The recess end (8) and the grasp end (9) are connected to each other by means of a plug-in connection using a connecting piece (23) configured with pins or connectors.

REFERENCE NUMERALS 1 handle
2 belt strap
3 latch plate
4 first height
41 second height
5 length of basic member
6 first face of basic member
7 second phase of basic member
8 recess end
9 grasp end
10 recess
101 first recess side surface
102 second recess side surface
103 third recess side surface
104 fourth recess side surface
11 first limb
12 second limb
13 engagement means
14 loop
15 recess opening
16 opening width of the recess opening
17 width of the belt strap
18 first recess enlargement
19 second recess enlargement
20 first edge of the belt strap
21 second edge of the belt strap
22 pin
23 connecting piece

The invention claimed is:

1. A handle for a safety belt of a motor vehicle with a belt strap and a latch plate, the handle comprising a basic member with a first height, a second height, a length, a first face, a second face, a recess end, and a grasp end;
   wherein the recess end is formed with a recess for accommodating the belt strap;
   wherein the recess is delimited by a first recess side surface, a second recess side surface, a third recess side surface, and a fourth recess side surface, and wherein the first recess side surface is formed with a first limb and a second limb, wherein the recess side surfaces are formed with at least a thickness d and wherein the thickness d varies along the first height such that side faces of at least two recess side surfaces, which face the recess, exhibit a convex curvature;
   wherein the grasp end is formed with at least one engagement means, wherein the plane of an opening of the at least one engagement means lies in a plane substantially horizontal and perpendicular to the plane of the largest surface extension of the belt strap; and
   wherein the handle is attachable to the belt strap independently of the latch plate.

2. The handle of claim 1 wherein the at least one engagement means is arranged in the form of a loop.

3. The handle of claim 1 wherein the first limb and the second limb of the recess delimit a recess opening for introducing the belt strap, wherein the recess opening is formed along the height of the handle, and wherein the recess opening opens towards the first face and the second face of the handle.

4. The handle of claim 3 wherein the recess opening is formed with an opening width that is 0.25 to 0.1 times the width of the belt strap.

5. The handle of claim 3 wherein an ending of the first limb and/or the second limb of the recess facing the recess opening is/are curved in a direction pointing away from the recess.

6. The handle of claim 1 wherein the at least one engagement means is characterized by a longitudinal extension which is within a range of 0.4 to 0.9 times the length of the handle.

7. The handle of claim 1 further comprising at least one pin extending into the recess.

8. The handle of claim 1 wherein the basic member is formed integrally and in a single piece.

9. The handle of claim 1 wherein the basic member is composed of a material selected from the group consisting of organic polymer, biopolymer, metal, textile fabric, leather, wood, convoluted tubing, and combinations thereof.

* * * * *